United States Patent
Kawase et al.

(10) Patent No.: US 11,343,393 B2
(45) Date of Patent: May 24, 2022

(54) DISPLAY CONTROL APPARATUS, AND NON-TRANSITORY COMPUTER READABLE MEDIUM FOR CONTROLLING DISPLAY TIME OF IMAGES

(71) Applicant: FUJIFILM Business Innovation Corp., Tokyo (JP)

(72) Inventors: Fumiyoshi Kawase, Kanagawa (JP); Takashi Sakamoto, Kanagawa (JP); Tsukasa Tsushima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 313 days.

(21) Appl. No.: 16/351,552

(22) Filed: Mar. 13, 2019

(65) Prior Publication Data

US 2019/0373122 A1 Dec. 5, 2019

(30) Foreign Application Priority Data

Jun. 4, 2018 (JP) .............................. JP2018-107060

(51) Int. Cl.
*H04N 1/00* (2006.01)
*H04N 1/21* (2006.01)

(52) U.S. Cl.
CPC ..... *H04N 1/00458* (2013.01); *H04N 1/00129* (2013.01); *H04N 1/2104* (2013.01)

(58) Field of Classification Search
None
See application file for complete search history.

(56) References Cited

U.S. PATENT DOCUMENTS 9,888,133 B2 * 2/2018 Kida ..................... G06F 3/1423
2007/0291303 A1 * 12/2007 Tanaka ............... H04N 1/00474
358/1.15

(Continued)

FOREIGN PATENT DOCUMENTS

JP 2008135994 A * 6/2008
JP 2016096510 5/2016

OTHER PUBLICATIONS

Soeda, Takeya, JP-2008-135994A English Translation, par 0008, 0010, 0014-0015, 0023-0028 (Year: 2008).*

(Continued)

*Primary Examiner* — Miya J Williams
(74) *Attorney, Agent, or Firm* — JCIPRNET

(57) ABSTRACT

A display control apparatus includes an acquisition unit that acquires image data, a memory that saves a display time of an image indicated by the image data acquired by the acquisition unit and a display cycle of the image indicated by the image data in association with each other, a setting unit that, if the acquisition unit newly acquires image data, sets the display time and the display cycle of the image indicated by the newly acquired image data, in response to a number of images to be displayed, and the display times and the display cycles of the images to be displayed, a display that causes an external apparatus to display the display time and the display cycle of the image indicated by the newly acquired image data and set by the setting unit, a receiving unit that receives a modification of each of the display time and the display cycle displayed on the external apparatus, and a display controller that causes the display to display the image, indicated by the image data newly acquired by the acquisition unit, in accordance with the display time and the display cycle received by the receiving unit.

10 Claims, 5 Drawing Sheets

(56) References Cited

U.S. PATENT DOCUMENTS

2016/0142563 A1* 5/2016 Kida .................... H04N 1/0044
  358/1.15
2020/0097238 A1* 3/2020 Kawase ............. H04N 1/00506

OTHER PUBLICATIONS

"Office Action of Japan Counterpart Application", dated Jan. 5, 2022, with English translation thereof, pp. 1-8.

* cited by examiner

DISPLAY CONTROL APPARATUS, AND NON-TRANSITORY COMPUTER READABLE MEDIUM FOR CONTROLLING DISPLAY TIME OF IMAGES

CROSS-REFERENCE TO RELATED APPLICATIONS

This application is based on and claims priority under 35 USC 119 from Japanese Patent Application No. 2018-107060 filed Jun. 4, 2018.

BACKGROUND

(i) Technical Field

The present disclosure relates to a display control apparatus, and a non-transitory computer readable medium.

(ii) Related Art

Japanese Unexamined Patent Application Publication No. 2016-96510 discloses a digital signage apparatus that displays a document read by an image forming apparatus. The image forming apparatus reads a document, generates, and saves multiple pieces of image data. In response to a user's operation, the image forming apparatus performs a display setting, such as a layout of how the multiple pieces of image data are displayed, a display cycle throughout which the image data is displayed, and the display order of the image data, and stores program information that indicates the display setting made. The image forming apparatus transmits the image data and program information to the digital signage apparatus, and the digital signage apparatus receives the image data and program information transmitted from the image forming apparatus. The digital signage apparatus displays an image, indicated by the received image data, in accordance with the program information.

SUMMARY

Aspects of non-limiting embodiments of the present disclosure relate to a digital signage apparatus that successively displays multiple images during a set display time. If an image to be displayed is added in such a digital signage apparatus, the acquisition of the image lengthens the display time if the display time of each image is fixed. If the display cycle of each image is fixed with the image added, the display time of each image is shortened as the number of images to be displayed increases.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a display control apparatus. The display control apparatus includes an acquisition unit that acquires image data, a memory that saves a display time of an image indicated by the image data acquired by the acquisition unit and a display cycle of the image indicated by the image data in association with each other, a setting unit that, if the acquisition unit newly acquires image data, sets the display time and the display cycle of the image indicated by the newly acquired image data, in response to a number of images to be displayed, and the display times and the display cycles of the images to be displayed, a display that causes an external apparatus to display the display time and the display cycle of the image indicated by the newly acquired image data and set by the setting unit, a receiving unit that receives a modification of each of the display time and the display cycle displayed on the external apparatus, and a display controller that causes the display to display the image, indicated by the image data newly acquired by the acquisition unit, in accordance with the display time and the display cycle received by the receiving unit.

BRIEF DESCRIPTION OF THE DRAWINGS

Exemplary embodiment of the present disclosure will be described in detail based on the following figures, wherein.

DETAILED DESCRIPTION

Figure 1:
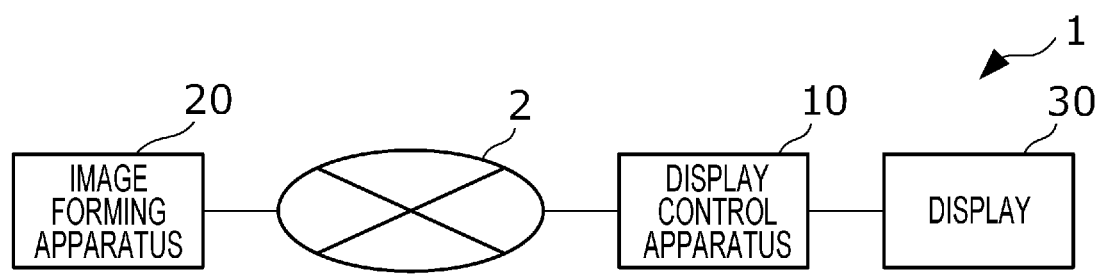
FIG. 1 illustrates an apparatus of a display system of an exemplary embodiment of the disclosure.

FIG. 1 illustrates a display system of an exemplary embodiment of the disclosure. The display system 1 is also referred to as a digital signage system that displays publicity and information by displaying a video or characters. A communication network 2 is used for data communication, and connects to multiple computers. The communication network 2 includes a wired communication network and/or a wireless communication network.

An image forming apparatus 20 is a multi-function apparatus having an image forming functionality to form an image on a paper sheet, a scanning functionality to read a document, a photocopying functionality, and a facsimile functionality. The image forming apparatus 20 is an example of a reading device in the exemplary embodiment of the disclosure. The image forming apparatus 20 is connected to the communication network 2, and is thus connected to other computers via the communication network 2 for data communication. According to the exemplary embodiment, the image forming apparatus 20 has a functionality to transmit image data indicating an image read through the scanning functionality to another computer via the communication network 2. Multiple image forming apparatuses 20 may be connected to the communication network 2. Referring to FIG. 1, a single communication network 2 is illustrated for simplicity of drawing.

The display 30 is a liquid-crystal display, for example, and is an example of a display in the exemplary embodiment of the disclosure. The display 30 is connected to the display control apparatus 10 and displays an image indicated by a video signal supplied from the display control apparatus 10. The display 30 is not limited to the liquid-crystal display, and may be a projector or an organic electroluminescent (EL) display. For simplicity of drawing, a single display 30 is illustrated in FIG. 1. Alternatively, multiple displays 30 may be connected to the display control apparatus 10.

The display control apparatus 10 is a computer that outputs the video signal indicating an image to be displayed on the display 30. The display control apparatus 10 is an example of a display control apparatus in the exemplary embodiment of the disclosure. The display control apparatus 10 is connected to the communication network 2, and acquires image data indicating the image to be displayed on the display 30 from another computer via the communication network 2. The display control apparatus 10 outputs to the display 30 the video signal responsive to the image indicated by the acquired image data, and causes the display 30 to display the image with the display time and cycle set for the image. The display control apparatus 10 stores multiple pieces of the image data and causes the display 30 to display the images of the image data while switching from one image to another.

The display system 1 may be typically installed in a shopping center. The display 30 may be installed in a passage of the shopping center. The image forming apparatus 20 and the display control apparatus 10 may be installed in an office of the shopping center. In the display system 1, the image forming apparatus 20 reads a document having publicity or information to be displayed on the display 30, the display control apparatus 10 saves the image data indicating the read document, and the display 30 displays the image indicated by the saved image data. When the document of publicity is read by the image forming apparatus 20, the read publicity is displayed on the display 30. If multiple pieces of image data are stored on the display control apparatus 10, the display control apparatus 10 may cause the multiple images to be displayed on the display 30 while switching from one image to another.

Figure 2:
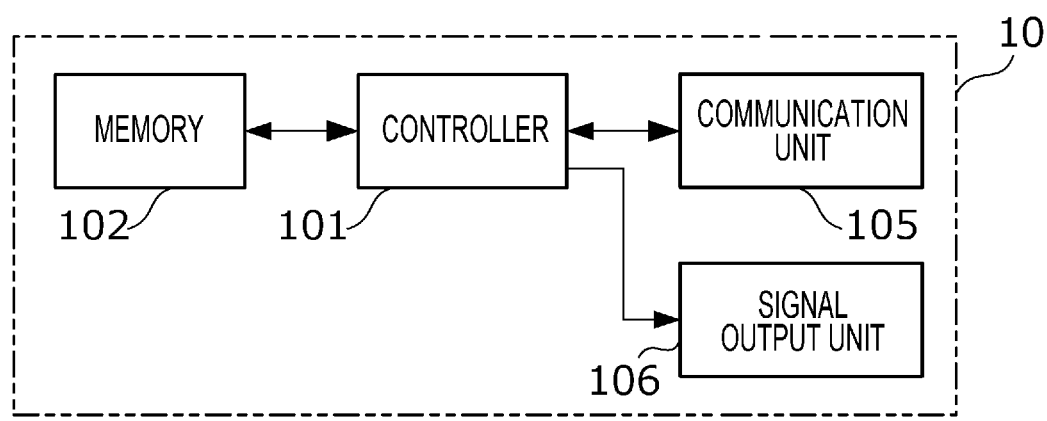
FIG. 2 is a block diagram illustrating a hardware configuration of a display control apparatus.

FIG. 2 illustrates the hardware configuration of the display control apparatus 10. A signal output unit 106 outputs a video signal indicating an image to be displayed on the display 30. A communication unit 105 functions as a communication interface that performs data communications via the communication network 2, and communicates with the image forming apparatus 20 via the communication network 2. A memory 102 may include a non-volatile memory, and saves the image data acquired from an external device.

A controller 101 includes a central processing unit (CPU), a random-access memory (RAM), and a read-only memory (ROM). Functionalities of the display control apparatus 10 are implemented when a program (software) stored on the ROM is read onto hardware, such as the CPU and the RAM, and the CPU executes the program. The CPU thus performs control of the memory 102, control of the communication unit 105, control of the signal output unit 106, and control of data reading and/or data writing to the RAM and the memory 102. The program stored on the ROM and executed by the CPU is an example of a program related to the exemplary embodiment of the disclosure.

Figure 3:
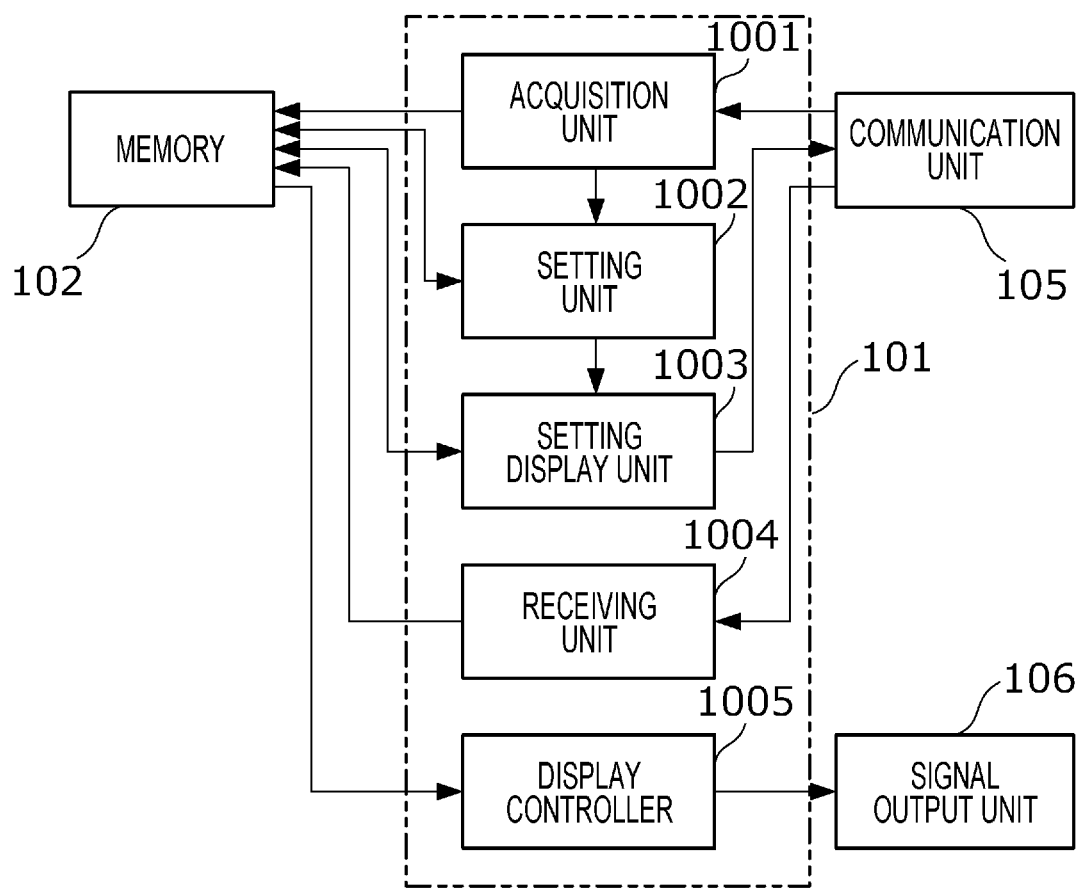
FIG. 3 is a functional block diagram illustrating of the display control apparatus.

FIG. 3 is a functional block diagram illustrating functionalities characteristic of the exemplary embodiment of the disclosure from among the functionalities implemented by the display control apparatus 10. An acquisition unit 1001 is an example of an acquisition unit of the exemplary embodiment of the disclosure. A setting unit 1002 sets a display time and a display cycle of an image indicated by image data acquired by the acquisition unit 1001. A setting display 1003 causes an external apparatus to display the display time and the display cycle set by the setting unit 1002. The setting display 1003 is an example of a display of the exemplary embodiment of the disclosure. A receiving unit 1004 receives a modification of the display time and cycle set displayed on the external apparatus by the setting display 1003. The receiving unit 1004 is an example of a receiving unit of the exemplary embodiment of the disclosure. A display controller 1005 causes the image indicated by the image data acquired by the acquisition unit 1001 to be displayed on the display 30 at the display time and cycle. The display controller 1005 is an example of a display controller of the exemplary embodiment of the disclosure.

Figure 4:
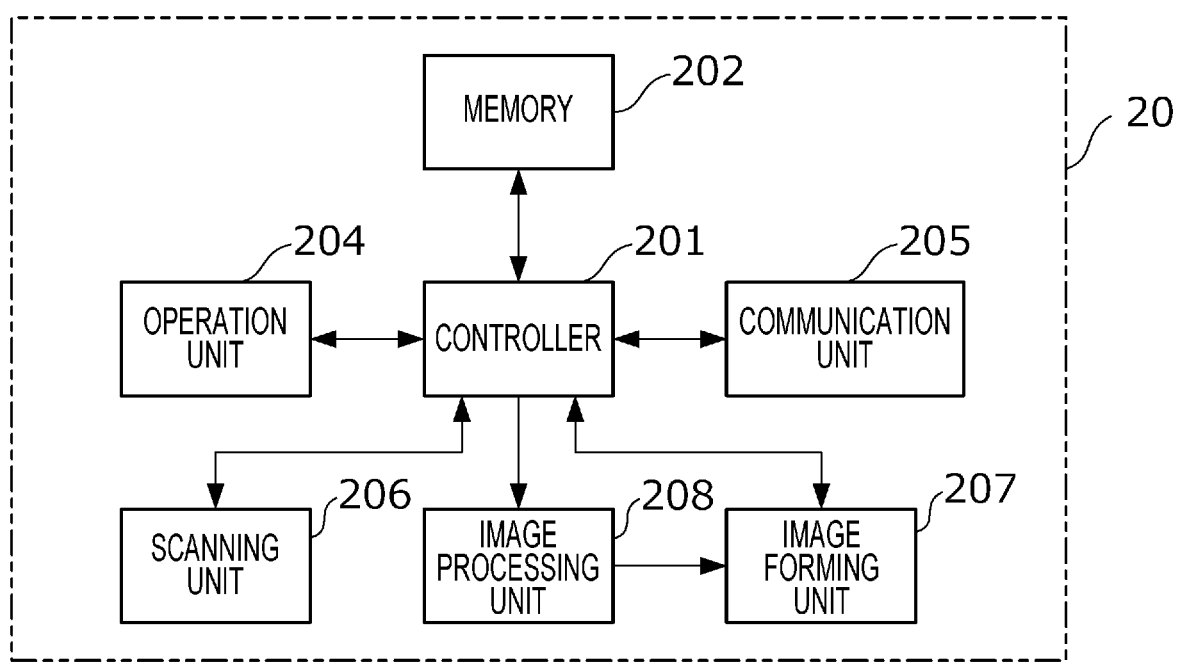
FIG. 4 is a block diagram illustrating a hardware configuration of an image forming apparatus.

FIG. 4 illustrates an example of the hardware configuration of the image forming apparatus 20. An operation unit 204 includes multiple buttons to operate the image forming apparatus 20. An operation unit 204 includes a touch panel that is a combination of a liquid-crystal display and a sensor that detects finger contact with a display screen of the liquid-crystal display. The touch panel displays a screen of graphic user interface (GUI) to operate the display control apparatus 20. According to the exemplary embodiment of the disclosure, the display control apparatus 20 includes the touch panel, and is operable with the touch panel and the buttons. Alternatively, the display control apparatus 20 may be without a touch panel, the liquid-crystal display thereof may display the screen of GUI, and the display control apparatus 10 may be operated using the buttons. A communication unit 205 is wiredly or wirelessly connected to the communication network 2, and communicates with another apparatus connected to the communication network 2 for data communications. The communication unit 205 is an example of an output unit of the exemplary embodiment of the disclosure.

A scanning unit 206 includes an image reading device (not illustrated) that optically reads a document, and generates an image file representing an image of the read document. The scanning unit 206 is an example of a reading unit of the exemplary embodiment of the disclosure. An image processing unit 208 performs image processing, such as color correction or gradation correction, on the image indicated by the image data supplied from a controller 201, and generates image data of yellow (Y), magenta (M), cyan (C), and black (K) images.

An image forming unit 207 forms a toner image on a paper sheet using an electrophotographic system. More specifically, the image forming unit 207 includes an image forming engine that forms a yellow toner image, an image forming engine that forms a magenta toner image, an image forming engine that forms a cyan toner image, and an image forming engine that forms a black toner image. After forming electrostatic latent images on a photoconductor drum in response to the image data output by the image processing unit 208, the forming engines attach toner on the surface of the photoconductor drum, form the yellow, magenta, cyan, and black toner images, and transfer the toner images to a paper sheet. Heat and pressure are applied to the toner images transferred to the paper sheet, and the paper sheet having the toner images thereon is discharged out of the image forming apparatus 20. According to the exemplary embodiment of the disclosure, the image is formed on the paper sheet using toner. Alternatively, the image may be formed on the paper sheet using ink of the ink-jet system. In addition to the four-color image forming engines, the image forming unit 207 may include an image forming engine of another color.

A memory 202, including a storage device that saves semi-permanently data, saves image data that the communication unit 205 has received from another apparatus.

The controller 201 includes a central processing unit (CPU), and a memory. Functionalities of the image forming apparatus 20 are implemented when a program (software) stored on the memory 202 is read onto hardware, such as the CPU and memory, and the CPU performs arithmetic operations to perform control of each element, and control for reading data from and/or writing data to the memory 202.

A process of the exemplary embodiment is described below. A user of the display system 1 operates the image forming apparatus 20, and causes the image forming apparatus 20 to read a document of publicity to be displayed on the display 30. The image forming apparatus 20 generates the image data indicating the read document. When the image forming apparatus 20 completes the reading of the document, the user performs an operation to transmit the generated image data to the display control apparatus 10. When the operation is performed, the image forming apparatus 20 transmits the generated image data to the display control apparatus 10. The display control apparatus 10 (the acquisition unit 1001) acquires the image data from the image forming apparatus 20.

Figure 5:
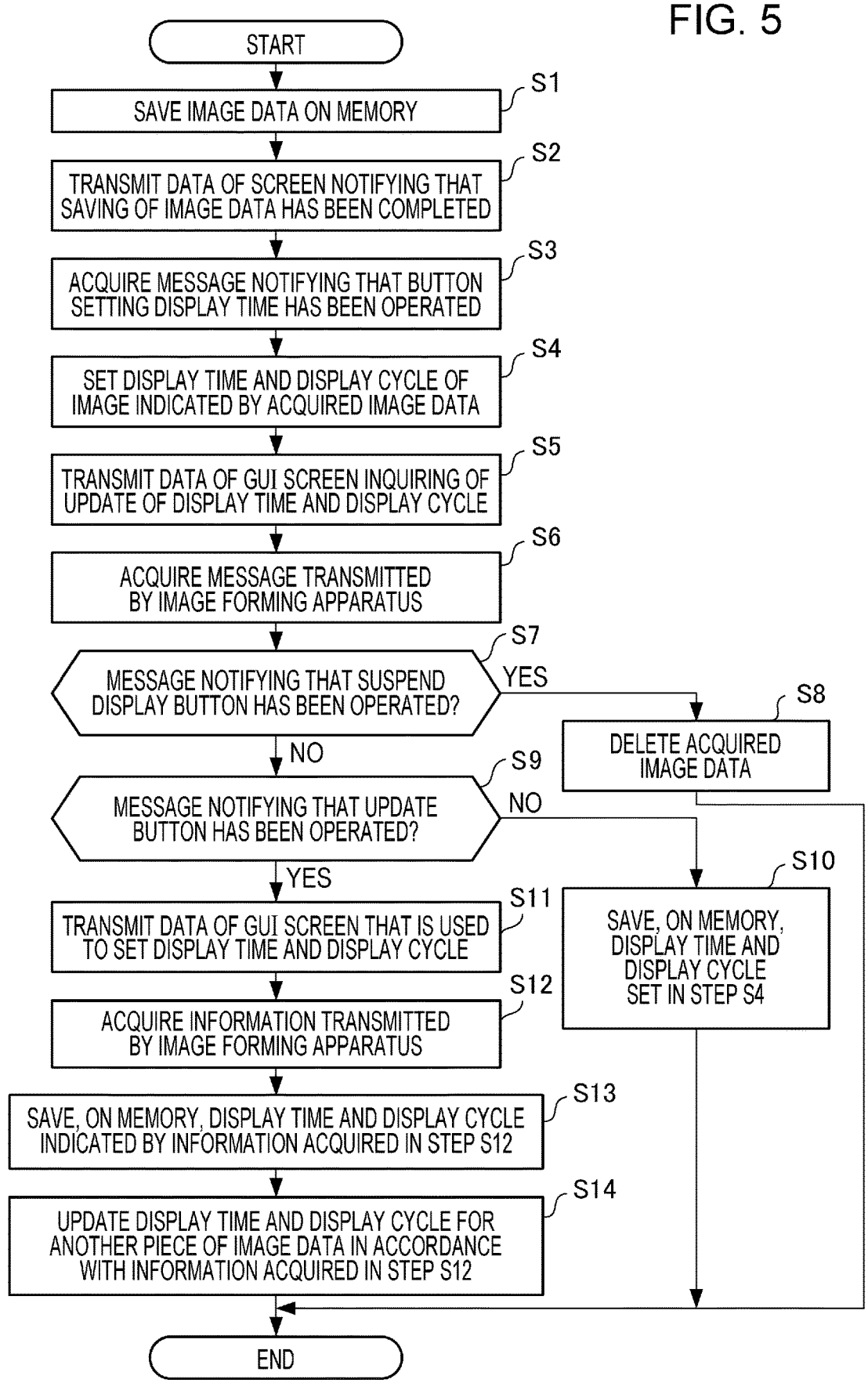
FIG. 5 is a flowchart illustrating a process performed by a controller.

FIG. 5 is a flowchart illustrating a process performed by the display control apparatus 10 that has acquired the image data. The controller 101 (the acquisition unit 1001) saves the acquired image data on the memory 102 (step S1). The controller 101 transmits, to the image forming apparatus 20, data of a screen notifying that the saving of the image data is complete (step S2). Upon receiving the data from the display control apparatus 10, the image forming apparatus 20 displays the screen notifying that the saving of the image data is complete on the touch panel of the operation unit 204 in response to the acquired data.

Figure 6:
FIG. 6 illustrates an example of a screen displayed by the image forming apparatus.

FIG. 6 illustrates an example of a screen notifying that the saving of the image data is complete. Upon confirming the screen of FIG. 6, the user operates a button for "SET DISPLAY TIME" displayed on the screen of FIG. 6. When the button for "SET DISPLAY TIME" is operated on the touch panel, the image forming apparatus 20 transmits to the display control apparatus 10 a message notifying that the button has been operated.

The communication unit 105 receives the message. The controller 101 acquires the message received by the communication unit 105 (step S3). Upon receiving the message notifying that the button for "SET DISPLAY TIME" has been operated, the controller 101 (the setting unit 1002) sets the display time and cycle for the image indicated by the acquired image data (step S4). The controller 101 sets the display time to be a predetermined duration, and sets the display cycle to be the display time of another image to be displayed on the display 30. For example, the controller 101 sets the display time to be 10 seconds. For example, there may be two other images to be displayed on the display 30, and each of the images may have a display time of 10 seconds. An image indicated by the image data that is received after the displaying of the two images may be displayed. In such a case, the display cycle of that image may be set to be 20 seconds.

Upon completing the operation in step S4, the controller 101 (the setting display 1003) transmits the data of a graphical user interface (GUI) to the image forming apparatus 20 (step S5). The GUI includes the number of images that the display control apparatus 10 successively displays on the display 30 at this moment and each of the display time and the display cycle set in step S4, and inquires of a modification of each of the display time and the display cycle. Upon acquiring the data, the image forming apparatus 20 displays on the touch panel of the operation unit 204 the GUI screen that inquires of the modification of each of the display time and the display cycle.

Figure 7:
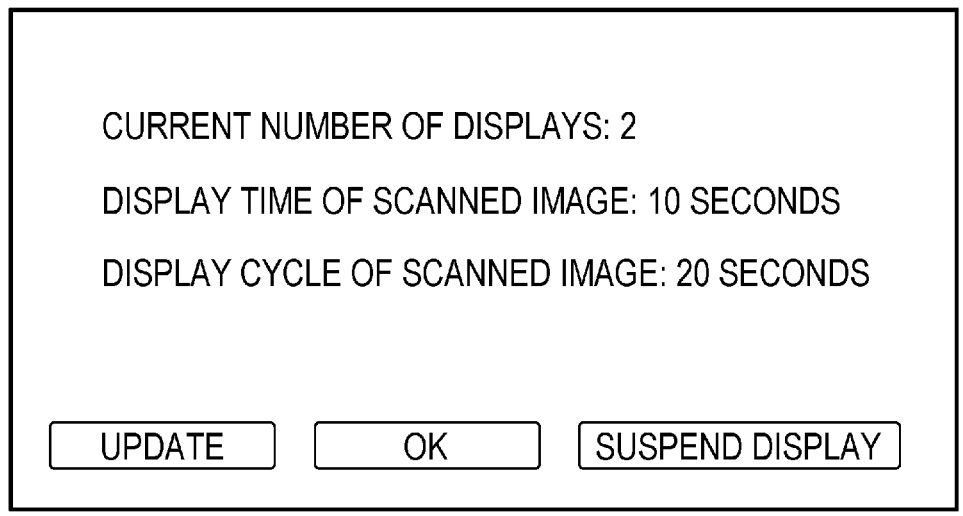
FIG. 7 illustrates an example of the screen displayed by the image forming apparatus.

FIG. 7 illustrates an example of the GUI screen that inquires of the modification of each of the display time and the display cycle. The screen of FIG. 7 displays the number of images that the display control apparatus 10 displays successively on the display 30, and the display time and the display cycle set for the scanned image. The screen of FIG. 7 includes three buttons.

When the user operates a button for "SUSPEND DISPLAY" on the screen of FIG. 7, the image forming apparatus 20 transmits to the display control apparatus 10 the message notifying that the button for "SUSPEND DISPLAY" has been operated. The communication unit 105 receives the message. The controller 101 acquires the message received by the operation unit 104 (step S6).

If the acquired message is the message notifying that the button for "SUSPEND DISPLAY" has been operated (yes branch from step S7), the controller 101 deletes the image data saved on the controller 101 in step S1 (step S8), and ends the process of FIG. 5. Since the acquired image data is deleted, the image of the acquired image data is not displayed on the display 30.

When the user operates an "OK" button on the screen of FIG. 7, the image forming apparatus 20 transmits to the display control apparatus 10 the message notifying that the "OK" button has been operated. The communication unit 105 receives the message. The controller 101 acquires the message received by the communication unit 105 (step S6). If the acquired message is the message notifying that the "OK" button has been operated (no branch from step S7 and no branch from step S9), the controller 101 causes the memory 102 to save the display time and cycle set in step S4 concerning the display time and cycle of the image indicated by the image data saved on the memory 102 in step S1 (step S10).

When the user operates an "UPDATE" button on the screen of FIG. 7, the image forming apparatus 20 transmits to the display control apparatus 10 a message that the "UPDATE" button has been operated. The communication unit 105 receives the message. The controller 101 acquires the message received by the communication unit 105 (step S6). If the message is the message notifying that the "UPDATE" button has been operated (no branch from step S7 and yes branch from step S9), the controller 101 transmits, to the image forming apparatus 20, the GUI screen data used to set the display time and cycle (step S11). Upon receiving the data, the image forming apparatus 20 displays on the touch panel of the operation unit 204 a GUI screen used to set the display time and cycle.

Figure 8:
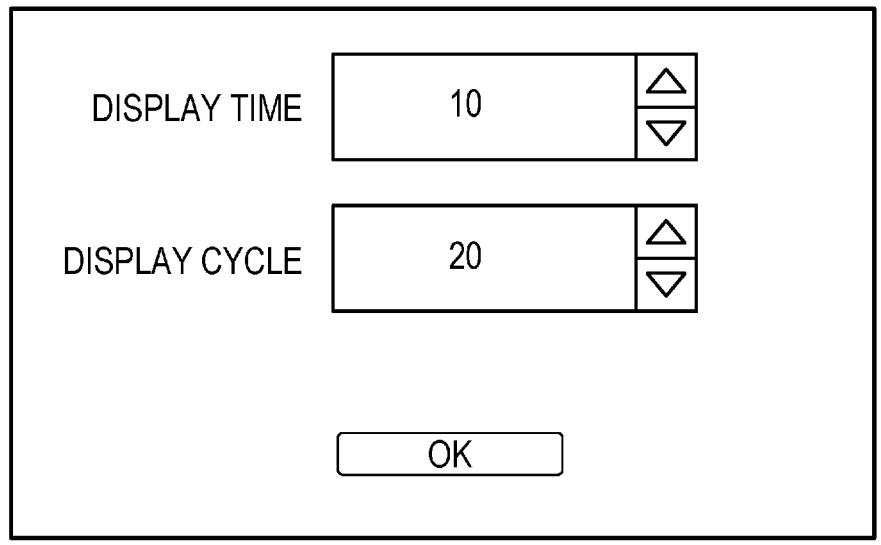
FIG. 8 illustrates an example of the screen displayed by the image forming apparatus.

FIG. 8 illustrates an example of the GUI screen that is used to set the display time and cycle. The screen of FIG. 8 includes a GUI for a spin button to set the display time, and a GUI for a spin button to set the display cycle. When the user operates the spin button to set the display time on the touch panel, the display time will increase or decrease. When the user operates the spin button to set the display cycle on the touch panel, the display cycle will increase or decrease. When the user operates the OK button on the touch panel, the image forming apparatus 20 transmits, to the display control apparatus 10, information indicating the display time displayed on the GUI and information indicating the display cycle displayed on the GUI.

The communication unit 105 receives the information indicating the display time and the information indicating the display cycle. The controller 101 (the receiving unit 1004) receives the information received by the communication unit 105 (step S12). The controller 101 (the receiving unit 1004) causes the memory 102 to save the information acquired in step S12 and indicating the display time and cycle in connection with the display time and cycle of the image indicated by the image data saved on the memory 102 in step S1 (step S13).

The controller 101 updates the display time and cycle for another image to be displayed on the display 30 in response to the information acquired in step S12 (step S14). For example, the controller 101 may now display the newly acquired image data in addition to the images of two pieces of image data on the display 30, and the display cycle indicated by the information acquired in step S12 may be 15 seconds. In such a case, during a time duration of 15 seconds as the display time of the image of the acquired image data, the two other images are displayed while being switched from one image to another. The controller 101 thus modifies the display time saved on the memory 102 to 7.5 seconds for each of the two images. The controller 101 updates to the display time indicated by the acquired information the display time saved on the memory 102 as the display time of the image of the acquired image data.

Upon completing the process of FIG. 5, the controller 101 (the display controller 1005) outputs to the signal output unit 106 the video signal responsive to the image indicated by the image data such that the image indicated by the image data saved on the memory 102 is displayed at the display time and cycle stored in association with each other.

The exemplary embodiment of the disclosure has been described. The disclosure is not limited to the exemplary embodiment described above. The exemplary embodiment may be modified as described below. The exemplary embodiment and the modifications may be combined.

According to the exemplary embodiment of the disclosure, a priority is set for the image data saved on the memory 102, and the display time and cycle of the image indicated by the image data may be set in accordance with the set priority. For example, the image data having the priority below a predetermined threshold value may be set to have the display time that is settable within a predetermine time range by the user using the GUI. The display time that is settable by the user using the GUI may be a duration of time or longer. As the set priority increases, the controller 101 may set the display time settable by the user using the GUI to be longer. As the set priority decreases, the controller 101 may set the display time settable by the user using the GUI to be shorter.

The priority of the image data may be set in response to the user who operates the image forming apparatus 20. For example, the image forming apparatus 20 may save a user identification (ID) and a password of the user who operates the image forming apparatus 20, and authenticates the user in accordance with the user ID and password. The image forming apparatus 20 saves the user ID and the priority determined for the user in association with each other. When the image data is transmitted to the display control apparatus 10, the image forming apparatus 20 sets the priority, associated with the user ID of the authenticated user, for the image data. The user ID and the priority set for the user are saved on the memory 102 in association with each other, and the controller 101 sets the priority for the image data. In this configuration, the image forming apparatus 20 transmits to the display control apparatus 10 the user ID of the authenticated user together with the image data. The controller 101 acquires the image data and the user ID from the image forming apparatus 20, and sets the priority, associated with the acquired user ID, for the image data.

According to the exemplary embodiment of the disclosure, if the number of pieces of the image data saved on the memory 102 exceeds a predetermined value, the number of images that are successively displayed on the display 30 while being switched from one image to another may be set to be a predetermined value. If the number of images that are successively displayed on the display 30 while being switched from one image to another may be set to be the predetermined value, from among the pieces of the image data saved on the memory 102, a predetermined number of pieces of the image data in the order of saving date from older to younger date are displayed on the display 30 while the images of other image data are not displayed. If the number of pieces of the image data saved on the memory 102 exceeds the predetermined value, the controller 101 may delete the image data having the oldest saving date out of the saved image data. According to the exemplary embodiment of the disclosure, if the number of pieces of the image data set to be displayed out of the image data saved on the memory 102 exceeds the predetermined value, the number of images to be successively displayed on the display 30 with one image switched to another may be limited to a predetermined value.

According to the exemplary embodiment of the disclosure, if the image data is as old as or older than a predetermined time from the saving on the memory 102, the image indicated by the image data may not be displayed on the display 30.

According to the exemplary embodiment of the disclosure, if the number of pieces of the image data saved on the memory 102 exceeds a predetermined value, the image indicated by the image data having the set priority below a predetermined threshold value may not be displayed on the display 30. According to the exemplary embodiment of the disclosure, if the number of pieces of the image data set to be displayed out of the image data saved on the memory 102 exceeds a predetermined value, the image indicated by the image data having the set priority below a predetermined threshold value may not be displayed on the display 30.

According to the exemplary embodiment of the disclosure, if the number of pieces of the image data set to be displayed exceeds a predetermined value, the display region of the display 30 may be partitioned into multiple sub-regions, and the images of the image data may be separately displayed on different sub-regions. According to the exemplary embodiment of the disclosure, if the number of pieces of the image data saved on the memory 102 exceeds a predetermined value, the display region of the display 30 may be partitioned into multiple sub-regions, and the images of the image data may be separately displayed on different sub-regions. According to the exemplary embodiment of the disclosure, when the display region of the display 30 is partitioned into multiple sub-regions, an image satisfying a predetermined condition may not be displayed on the sub-region. For example, the controller 101 may perform character recognition on the image indicated by the image data, and if the number of characters in the image is equal to or above a predetermined threshold value or if the size of characters in the image is below a predetermined value, the image may not be displayed on the sub-region.

According to the exemplary embodiment of the disclosure, if the display time and cycle are updated as a result of acquiring new image data, the user who has performed an operation to read the image may be notified that the display time and cycle have been updated. In this configuration, the image forming apparatus 20 saves the user's mail address in association with the user ID. When the image data is transmitted to the display control apparatus 10, the image forming apparatus 20 also transmits the mail address associated with the user ID of the user who has been authenticated. The display control apparatus 10 acquires the image data and the mail address and saves the image data and the mail address in association with each other. When the display time and cycle of the image indicated by the image data stored are updated, the controller 101 transmits to the mail address saved in association with the image data an email that notifies that the display time and cycle of the document on which the user has performed a reading operation are updated.

According to the exemplary embodiment of the disclosure, the display setting of the image is made by an operation on the operation unit 204. The display setting of the image is not limited to the exemplary embodiment. For example, a personal computer connected to the communication network 2 or a personal computer connected to the display control apparatus 10 may be a controller of the display control apparatus 10. In such a configuration, the display control apparatus 10 causes the personal computer to display the screen of FIG. 6 or FIG. 7, and performs the display setting of the image to be displayed on the display 30 in response to an operation performed on the screen displayed on the personal computer. According to the disclosure, the display control apparatus 10 and the display 30 may be integrated into a unitary body. If the display control apparatus 10 and the display 30 are integrated into a unitary body, and the display 30 has a touch panel, the screen of FIG. 6 or FIG. 7 may be displayed on the display 30 and the display control apparatus 10 may be operated using the touch panel. If the display control apparatus 10 and the display 30 are integrated into a unitary body, and the display 30 has no touch panel, the screen of FIG. 6 or FIG. 7 may be displayed on the display 30 and the display control apparatus 10 may be operated using a mouse and a keyboard. According to the disclosure, the screen of FIG. 6 or FIG. 7 may be displayed on whole or part of the screen of the display 30. According to the disclosure, the screen of FIG. 6 or FIG. 7 may be displayed on part or whole of the screen of the display 30.

According to the exemplary embodiment of the disclosure, the display control apparatus 10 acquires the image data from the image forming apparatus 20. The display control apparatus 10 may acquire the image data from a scanning device that read the image of a document and generates the image data of the read image. The display control apparatus 10 may acquire the image data indicating the image to be displayed on the display 30, from the personal computer connected to the communication network 2 or an external server.

The program related to the disclosure may be supplied in a recorded form on one of computer readable recording media including a magnetic recording medium (such as a magnetic tape, a hard disk drive (HDD), or a flexible disk (FD)), an optical recording medium (such as an optical disk), a magneto-optical recording medium, and a semiconductor memory, and is then installed onto the computer. Alternatively, the program may be downloaded onto the computer via the communication network 2 and then installed onto the computer.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display control apparatus comprising:
   a processor that acquires image data;
   a memory that saves a display time of an image indicated by the image data and a display cycle of the image indicated by the image data, in association with each other,
   wherein the processor is configured to:
      in response to newly acquiring image data, set a priority, the display time and the display cycle of the image indicated by the newly acquired image data, according to a number of images to be displayed, and the display times and the display cycles of the images to be displayed;
      cause an external apparatus to display the display time and the display cycle of the image indicated by the newly acquired image data;
      receive a modification of each of the display time and the display cycle displayed on the external apparatus;
      cause the display to display the image, indicated by the image data and the newly acquired image data, in accordance with the modification of the display time and the display cycle; and
      cause the display not to display the image having the priority that is below a first predetermined threshold value.

2. The display control apparatus according to claim 1, wherein the processor acquires information on a user who has provided the acquired image data, and
   wherein the processor receives the modification of each of the display time and the display cycle, displayed on the display, on a per piece basis of the information on the user within a predetermined range, concerning the image indicated by the newly acquired image data.

3. The display control apparatus according to claim 2, wherein the processor limits the modification of each of the display time and the display cycle of the image indicated by the newly acquired image data, in response with the information on the user.

4. The display control apparatus according to claim 1, wherein the processor does not display the image indicated by the image data if a number of images to be displayed is equal to or above a second predetermined threshold value.

5. The display control apparatus according to claim 4, wherein the processor does not display the image indicated by the image data that is saved on the memory and that is older than a predetermined period of time from a date and time of acquisition of the image data.

6. The display control apparatus according to claim 4, wherein the processor acquires information on a user who has provided the acquired image data,
   wherein the processor sets the priority of the image indicated by the newly acquired image data in response to the information on the user.

7. The display control apparatus according to claim 1, wherein if the number of images to be displayed is equal to or above a third predetermined threshold value, the processor partitions a display region of the display into a plurality of sub-regions and causes images of different image data to be respectively displayed on the partitioned sub-regions.

8. The display control apparatus according to claim 7, wherein the processor causes an image indicated by the image data that satisfies a predetermined condition to be displayed on the sub-region.

9. A non-transitory computer readable medium storing a program causing a computer to execute a process for controlling displaying, the process comprising:

acquiring image data;

in response to newly acquiring image data, setting a priority, a display time and a display cycle of an image indicated by the newly acquired image data, according to a number of images to be displayed, and the display times and the display cycles of the images to be displayed;

causing an external apparatus to display the display time and the display cycle of the image set and indicated by the newly acquired image data;

receiving a modification of each of the displayed display time and the displayed display cycle;

causing the display to display the image, indicated by the image data and the newly acquired image data, in accordance with the modification of the received display time and the received display cycle; and causing the display not to display the image having the priority that is below a first predetermined threshold value.

10. A display control apparatus comprising:

acquisition means for acquiring image data;

memory means for saving a display time of an image indicated by the image data acquired by the acquisition means and a display cycle of the image indicated by the image data, in association with each other;

setting means for, in response to newly acquiring image data, setting a priority, the display time and the display cycle of the image indicated by the newly acquired image data, according to a number of images to be displayed, and the display times and the display cycles of the images to be displayed;

display means for causing an external apparatus to display the display time and the display cycle of the image indicated by the newly acquired image data and set by the setting means;

receiving means for receiving a modification of each of the display time and the display cycle displayed on the external apparatus; and display control means for causing the display means to display the image, indicated by the image data and the newly acquired image data newly acquired by the acquisition means, in accordance with the modification of the display time and the display cycle received by the receiving means and causing the display means not to display the image having the priority that is below a first predetermined threshold value.

* * * * *